US010134691B2

(12) United States Patent
Choi et al.

(10) Patent No.: US 10,134,691 B2
(45) Date of Patent: Nov. 20, 2018

(54) APPARATUS AND METHOD FOR GENERATING IDENTIFICATION KEY

(71) Applicant: ICTK Holdings Co., Ltd., Seongnam-si (KR)

(72) Inventors: Byong Deok Choi, Seoul (KR); Dong Kyue Kim, Seoul (KR)

(73) Assignee: ICTK Holdings Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/028,166

(22) PCT Filed: Feb. 17, 2014

(86) PCT No.: PCT/KR2014/001250
§ 371 (c)(1),
(2) Date: Apr. 8, 2016

(87) PCT Pub. No.: WO2015/053440
PCT Pub. Date: Apr. 16, 2015

(65) Prior Publication Data
US 2016/0247768 A1    Aug. 25, 2016

(30) Foreign Application Priority Data

Oct. 8, 2013   (KR) ........................ 10-2013-0120141

(51) Int. Cl.
*H01L 29/40*       (2006.01)
*H01L 23/00*       (2006.01)
(Continued)

(52) U.S. Cl.
CPC ........ *H01L 23/573* (2013.01); *G06F 17/5072* (2013.01); *G06F 21/73* (2013.01);
(Continued)

(58) Field of Classification Search
CPC . H04L 9/3247; H04L 63/0853; H04L 9/0825; H04L 9/0861; H04L 63/0823;
(Continued)

(56) References Cited

U.S. PATENT DOCUMENTS

| 2005/0268174 | A1 | 12/2005 | Kumagai |
| 2010/0070777 | A1 | 3/2010 | Salters et al. |
| 2013/0101114 | A1* | 4/2013 | Kim ........................ G06F 21/73 380/44 |

FOREIGN PATENT DOCUMENTS

| EP | 3043281 A1 | 7/2016 |
| JP | 3804670 B2 | 8/2006 |

(Continued)

OTHER PUBLICATIONS

ISA Korean Intellectual Property Office, International Search Report Issued in Application No. PCT/KR2014/001250, Jun. 26, 2014, WIPO, 4 pages.

(Continued)

*Primary Examiner* — Robert Bachner
(74) *Attorney, Agent, or Firm* — McCoy Russell LLP

(57) ABSTRACT

An apparatus for generating an identification key is provided. The apparatus may include a first conductive layer formed on a semiconductor chip, a second conductive layer formed on the semiconductor chip, wherein a spacing between the first conductive layer and the second conductive layer is equal to or greater than a first threshold and equal to or less than a second threshold, and a reader configured to determine whether a first node associated with the first conductive layer and a second node associated with the second conductive layer are shorted, and to provide an identification key.

8 Claims, 8 Drawing Sheets

(51) Int. Cl.

| | | |
|---|---|---|
| G06F 21/73 | (2013.01) | |
| G06F 17/50 | (2006.01) | |
| H01L 21/768 | (2006.01) | |
| H01L 21/8234 | (2006.01) | |
| H01L 23/528 | (2006.01) | |
| H01L 27/02 | (2006.01) | |
| H01L 27/06 | (2006.01) | |
| G09C 1/00 | (2006.01) | |
| H04L 9/08 | (2006.01) | |

(52) U.S. Cl.
CPC .......... *G09C 1/00* (2013.01); *H01L 21/76877* (2013.01); *H01L 21/823475* (2013.01); *H01L 23/528* (2013.01); *H01L 27/0207* (2013.01); *H01L 27/0629* (2013.01); *H04L 9/0866* (2013.01); *H04L 2209/12* (2013.01)

(58) Field of Classification Search
CPC ..... H04L 63/0876; H04L 9/30; H04L 9/3268; H04L 63/06; H04L 63/083; H04L 63/0884; H04L 63/102; H04L 67/42; H04L 9/0891
See application file for complete search history.

(56) References Cited

FOREIGN PATENT DOCUMENTS

| | | |
|---|---|---|
| KR | 1020090068987 A | 6/2009 |
| KR | 100926214 B1 | 11/2009 |
| KR | 101139630 B1 | 5/2012 |
| KR | 1020120089607 A | 8/2012 |
| WO | 2011088074 A2 | 7/2011 |

OTHER PUBLICATIONS

Nedospasov, D. et al., "Invasive PUF Analysis," Proceedings of the 2013 Workshop on Fault Diagnosis and Tolerance in Cryptography (FDTC '13), Aug. 20, 2013, Santa Barbara, California, 9 pages.

* cited by examiner

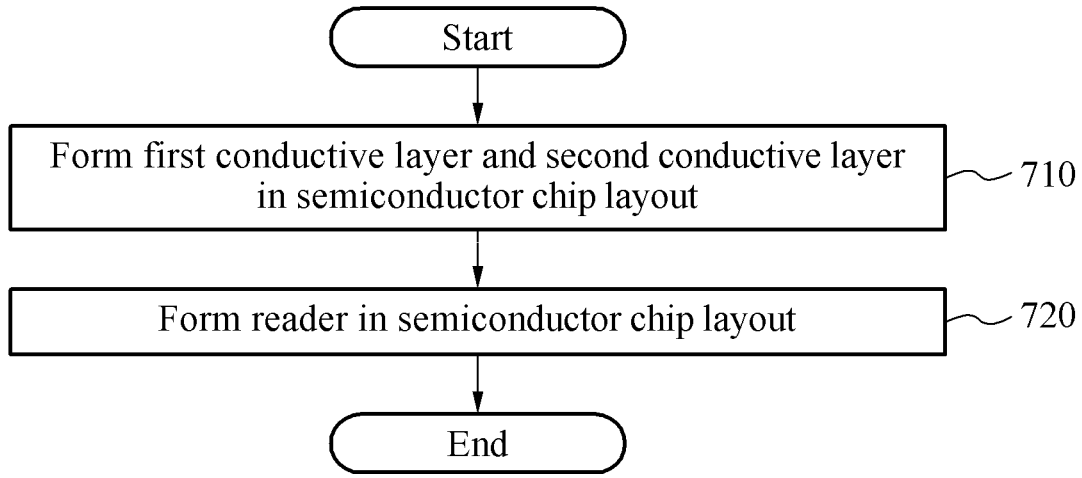
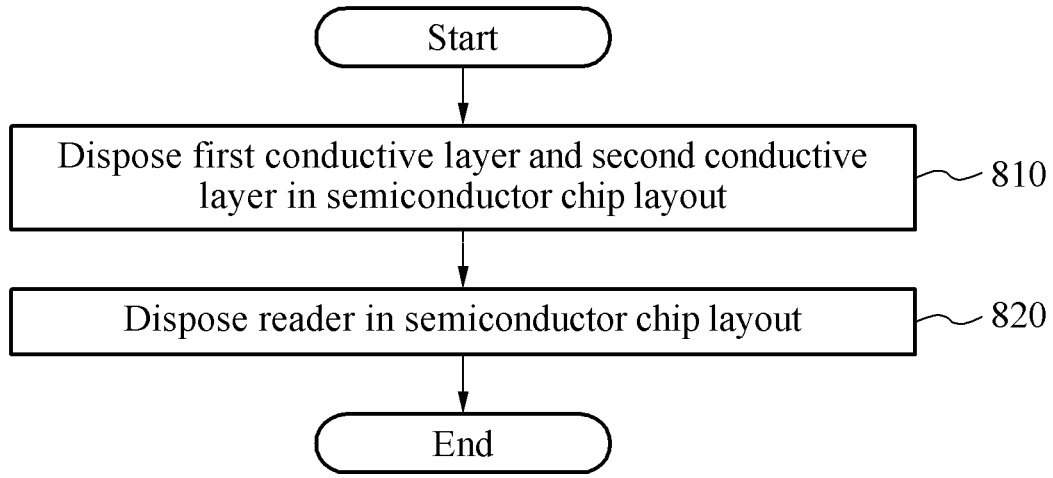

US 10,134,691 B2

APPARATUS AND METHOD FOR GENERATING IDENTIFICATION KEY

CROSS REFERENCE TO RELATED APPLICATIONS

The present application is a U.S. National Phase of International Patent Application Serial No. PCT/KR2014/001250, entitled "APPARATUS AND METHOD FOR GENERATING IDENTIFICATION KEY," filed on Feb. 17, 2014, which claims priority to Korean Patent Application No. 10-2013-0120141, entitled "APPARATUS AND METHOD FOR GENERATING IDENTIFICATION KEY," filed on Oct. 8, 2013, the entire contents of each of which are hereby incorporated by reference for all purposes.

TECHNICAL FIELD

The following description relates to an apparatus and method for generating an identification key for hardware security, and more particularly, to an apparatus and method for generating an identification key by implementing a physically unclonable function (PUF) based on a semiconductor process variation.

BACKGROUND ART

As an information-oriented society is being advanced, a necessity for protection of personal information is increasing. Also, there is a desire for a technology for building a security system configured to securely transmit the personal information by encrypting and decrypting the personal information.

Recently, various attacks, for example, a side channel attack or a reverse engineering attack, have been applied to an identification key stored in a computing device. For protection against the above attacks, a physically unclonable function (PUF) technology is being developed to securely generate and store an identification key.

A PUF may provide an identification key, that is, an unpredictable digital value. Individual PUFs may provide different digital values, even though an accurate manufacturing process is provided and the individual PUFs are manufactured through the same design and manufacturing process.

Accordingly, the PUF may be referred to as a "physical one-way function (POWF)" that is practically impossible to be duplicated.

The above characteristic of the PUF may be used to generate an identification key for security and/or authentication. For example, the PUF may be used to provide a unique key to distinguish devices from one another.

In Korean Patent Registration No. 10-1139630 (hereinafter, referred to as "'630 patent"), a method of implementing a PUF has been provided. The '630 patent discloses a method of probabilistically determining whether an interlayer contact or a via is formed between conductive layers of a semiconductor based on a semiconductor process variation.

DISCLOSURE OF INVENTION

Technical Solutions

According to an aspect of the present invention, there is provided an apparatus for generating an identification key, the apparatus including a first conductive layer formed in a semiconductor chip, a second conductive layer formed in the semiconductor chip, a spacing between the first conductive layer and the second conductive layer being equal to or greater than a first threshold and equal to or less than a second threshold, and a reader configured to determine whether a first node associated with the first conductive layer and a second node associated with the second conductive layer are shorted and to provide an identification key.

The first threshold may be a lower limit value of a range of the spacing between the first conductive layer and the second conductive layer to allow a difference between a probability that the first node and the second node are shorted and a probability that the first node and the second node are not shorted to be within a predetermined error range, and the second threshold may be an upper limit value of the range.

Whether the first node and the second node are shorted by the first conductive layer and the second conductive layer may be randomly determined by a process variation occurring in the semiconductor chip.

At least one of the first conductive layer and the second conductive layer may be at least a portion of wires individually patterned.

At least one of the first conductive layer and the second conductive layer may correspond to at least one of an N-well region, a P-well region, an N+ active region, a P+ active region, a poly layer and a metal layer included in the semiconductor chip.

The first threshold may be equal to or greater than a maximum spacing between the first conductive layer and the second conductive layer to guarantee that the first node and the second node are shorted by the first conductive layer and the second conductive layer, and the second threshold may be equal to or less than a minimum spacing between the first conductive layer and the second conductive layer to guarantee that the first node and the second node are open by the first conductive layer and the second conductive layer.

According to another aspect of the present invention, there is provided an apparatus for generating an N-bit identification key, the apparatus including N unit cells that each generate a 1-bit digital value, wherein at least one of the N unit cells includes a first conductive layer formed in a semiconductor chip, a second conductive layer formed in the semiconductor chip, a spacing between the first conductive layer and the second conductive layer being equal to or greater than a first threshold and equal to or less than a second threshold, and a reader configured to determine whether a first node associated with the first conductive layer and a second node associated with the second conductive layer are shorted and to provide an identification key.

The first threshold may be a lower limit value of a range of the spacing between the first conductive layer and the second conductive layer to allow a difference between a probability that the first node and the second node are shorted and a probability that the first node and the second node are not shorted to be within a predetermined error range, and the second threshold may be an upper limit value of the range.

Whether the first node and the second node are shorted by the first conductive layer and the second conductive layer may be randomly determined by a process variation occurring in the semiconductor chip.

The first threshold may be equal to or greater than a maximum spacing between the first conductive layer and the second conductive layer to guarantee that the first node and the second node are shorted by the first conductive layer and the second conductive layer, and the second threshold may be equal to or less than a minimum spacing between the first conductive layer and the second conductive layer to guarantee that the first node and the second node are open by the first conductive layer and the second conductive layer.

According to another aspect of the present invention, there is provided a method of manufacturing an apparatus generating an identification key, the method including disposing a first conductive layer and a second conductive layer in a semiconductor, and disposing a reader in the semiconductor, the reader being configured to determine whether a first node associated with the first conductive layer and a second node associated with the second conductive layer are shorted, wherein a spacing between the first conductive layer and the second conductive layer is equal to or greater than a first threshold and equal to or less than a second threshold, and the first threshold and the second threshold are less than a minimum spacing according to a design rule that ensures that the first node and the second node are open.

Whether the first node and the second node are shorted by the first conductive layer and the second conductive layer may be randomly determined by a process variation occurring in a semiconductor chip.

The first threshold may be a lower limit value of a range of the spacing between the first conductive layer and the second conductive layer to allow a difference between a probability that the first node and the second node are shorted and a probability that the first node and the second node are not shorted to be within a predetermined error range, and the second threshold may be an upper limit value of the range.

The first conductive layer and the second conductive layer may be at least a portion of wires individually patterned.

At least one of the first conductive layer and the second conductive layer may correspond to at least one of an N-well region, a P-well region, an N+ active region, a P+ active region, a poly layer and a metal layer included in a semiconductor chip.

According to another aspect of the present invention, there is provided a method of generating an identification key, the method including generating a potential difference between a first node associated with the first conductive layer and a second node associated with the second conductive layer, the first conductive layer and the second conductive layer being included in a semiconductor chip, and a spacing between the first conductive layer and the second conductive layer being equal to or greater than a first threshold and equal to or less than a second threshold, and determining, by a reader, whether the first node and the second node are shorted and providing an identification key, wherein the first threshold and the second threshold are less than a minimum spacing according to a design rule that ensures that the first node and the second node are open.

The first threshold may be a lower limit value of a range of the spacing between the first conductive layer and the second conductive layer to allow a difference between a probability that the first node and the second node are shorted and a probability that the first node and the second node are not shorted to be within a predetermined error range, and the second threshold may be an upper limit value of the range.

Whether the first node and the second node are shorted may be randomly determined by a process variation occurring in the semiconductor chip.

BRIEF DESCRIPTION OF DRAWINGS

FIG. 7 is a flowchart illustrating a method of manufacturing an apparatus for generating an identification key according to an embodiment.

FIG. 8 is a flowchart illustrating a method of designing an apparatus for generating an identification key according to an embodiment.

BEST MODE FOR CARRYING OUT THE INVENTION

Figure 1:
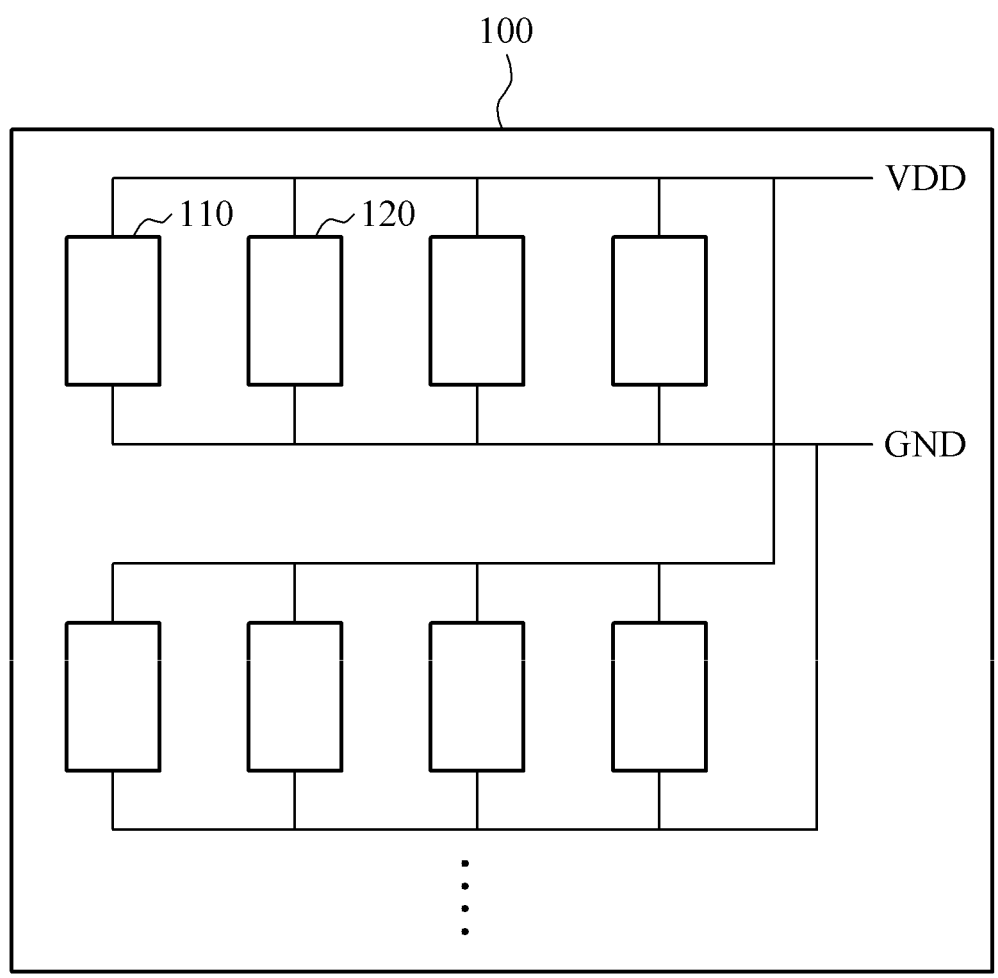
FIG. 1 is a block diagram illustrating an apparatus for generating an N-bit identification key according to an embodiment.

Hereinafter, some embodiments, specific features and advantages of the present invention will be more clearly understood from the following detailed description when taken in conjunction with the accompanying drawings. The present invention, however, should not be construed as limited to the embodiments set forth herein.

The terminologies or words used in the present specification and the claims of should be interpreted based on the meanings and concepts of the invention in keeping with the scope of the present invention based on the principle that the inventors can appropriately define the terms in order to describe the invention in the best way. In the following description, it is to be noted that, when it is determined detailed description related to a related known function or configuration they may make the purpose of the present invention unnecessarily ambiguous in describing the present invention, the detailed description will be omitted here. Like reference numerals illustrated in the drawings refer to like constituent elements.

FIG. 1 is a block diagram illustrating an apparatus 100 for generating an N-bit identification key according to an embodiment.

The apparatus 100 may include N unit cells, for example, unit cells 110 and 120, where N is a natural number.

Each of the N unit cells may provide a 1-bit digital value, and accordingly the apparatus 100 may provide an identification key of N-bits.

The apparatus 100 may generate an identification key using a semiconductor process. The generated identification key may have randomness, but may be invariant over time.

Reliability of the generated identification key to be used in a security field may be time-invariance that is invariant over time and randomness (referred to as "arbitrariness") of the generated identification key. The apparatus 100 may provide the randomness and the time-invariance at a high level.

For example, the apparatus 100 may be included as at least a portion of a semiconductor chip. In this example, whether nodes formed in a semiconductor manufacturing process are shorted may be randomly determined, and may not change based on time or use environment, and thus an identification key may remain unchanged once the identification key is generated.

Conductive layers may be disposed so that a spacing between the conductive layers may be less than a minimum spacing according to a design rule that ensures that nodes are open. By disposing the conductive layers, whether the conductive layers are shorted may be probabilistically determined, and thus it is possible to implement the apparatus 100 for generating an identification key having randomness. The spacing may refer to a gap between a first conductive layer and a second conductive layer.

In an existing semiconductor process, when a short circuit between conductive layers fails, the process may be determined to fail. However, the above process failure may be used to generate an identification key having randomness. In other words, based on a typical process failure that randomly occurs, a physically unclonable function (PUF) to generate an identification key may be generated.

Each of unit cells may include a first conductive layer, a second conductive layer and a reader.

An identification key generation process and a configuration of each of the unit cells 110 and 120 will be further described with reference to FIGS. 2 and 3.

Whether conductive layers are shorted may be determined using the reader, which will be further described with reference to FIGS. 5 and 6.

A spacing between conductive layers may be adjusted so that a probability that the conductive layers are shorted and a probability that the conductive layers are not shorted may be adjusted to have the same value, for example, 1/2. Despite the adjustment of the spacing, the probabilities may not be probabilistically guaranteed to be exactly the same. The probability that the conductive layers are shorted and the probability that the conductive layers are not shorted may be represented by, for example, digital values of "0" and "1," respectively.

Based on a value of a spacing, that is, a gap between a first conductive layer and a second conductive layer, a probability that a first node and a second node are shorted (or a probability that the first node and the second node are open) may change. When the spacing approaches a maximum spacing value guaranteeing that the first node and the second node are shorted, the probability that the first node and the second node are shorted may increase. When the spacing approaches a minimum spacing value guaranteeing that the first node and the second node are open, the probability that the first node and the second node are open may increase. When one of the probabilities increases, randomness of a generated identification key may decrease.

Figure 2:
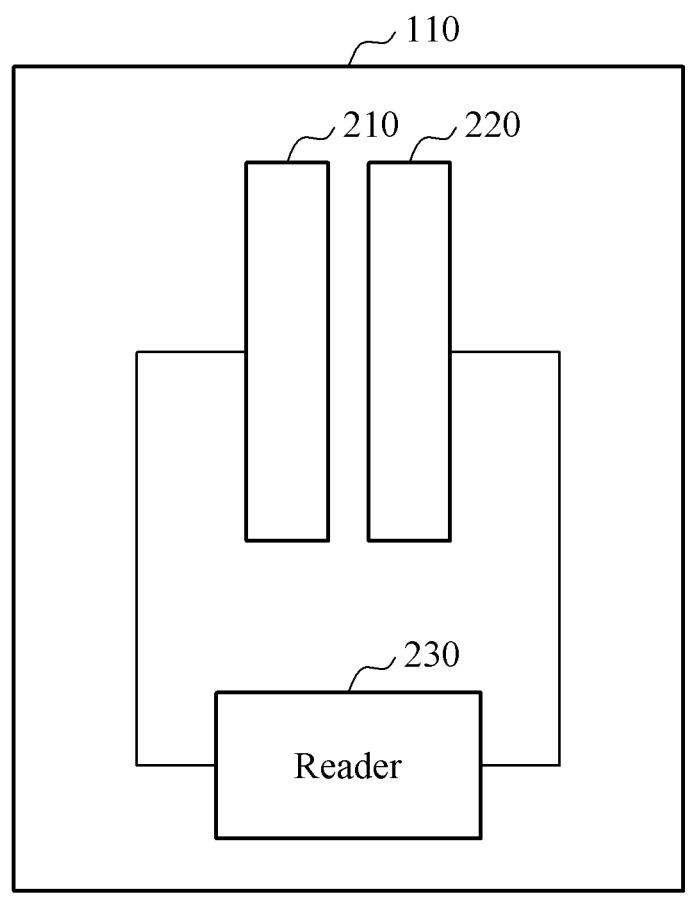
FIG. 2 is a diagram illustrating a configuration of an apparatus for generating an identification key according to an embodiment.

FIG. 2 is a diagram illustrating a configuration of an apparatus for generating an identification key according to an embodiment.

A unit cell 110 may include a first conductive layer 210, a second conductive layer 220 and a reader 230 included in a semiconductor chip.

A value of a spacing between the first conductive layer 210 and the second conductive layer 220 may be equal to or greater than a first threshold and equal to or less than a second threshold. The first threshold and the second threshold may be less than a minimum spacing value according to a design rule that ensures that a first node and a second node are open. The value of the spacing may be adjusted in a semiconductor design operation. However, this is merely an example, and it is possible to create the same result through an operation in a process. Accordingly, even though description of a portion of a design or a manufacturing process is provided below, it should be understood that there is no limitation to some embodiments by the description.

For example, when the value of the spacing between the first conductive layer 210 and the second conductive layer 220 becomes less than the minimum spacing value according to the design rule that ensures that the first node and the second node are open, a probability that the first node and the second node are open may gradually decrease. In this example, a probability that a pattern is formed between the first conductive layer and the second conductive layer may gradually increase.

For example, the value of the spacing may be set to be less than a minimum spacing value guaranteeing that conductive layers (for example, the first conductive layer and the second conductive layer) are open, and to be greater than a maximum spacing value guaranteeing that the conductive layers are shorted. In this example, both a probability that a first node associated with the first conductive layer 210 and a second node associated with the second conductive layer 220 are shorted and a probability that the first node and the second node are open may exist.

The first threshold may be a lower limit value of a range of a spacing between the first conductive layer and the second conductive layer to allow a difference between a probability that the first node and the second node are shorted and a probability that the first node and the second node are not shorted to be within a predetermined error range.

The second threshold may be an upper limit value of the range.

The first node and the second node may be, for example, conductive wires included in the same layer of the semiconductor chip. However, this is merely an example, and conductive nodes may be arbitrary conductive elements.

At least one of the first node and the second node may correspond to an N-well region, a P-well region, an N+ active region, a P+ active region, a poly layer and a metal layer.

Each of the first node and the second node may be at least a portion of wires patterned in parallel to each other.

The reader 230 may determine whether the first node and the second node are shorted.

When the first node and the second node are determined to be shorted, the reader 230 may output a digital value of "0" (or "1"). When the first node and the second node are determined not to be shorted, the reader 230 may output a digital value of "1" (or "0"). This will be further described with reference to FIGS. 5 and 6.

Whether the first node and the second node are shorted may be randomly determined by a process variation occurring in a semiconductor chip.

Figure 3:
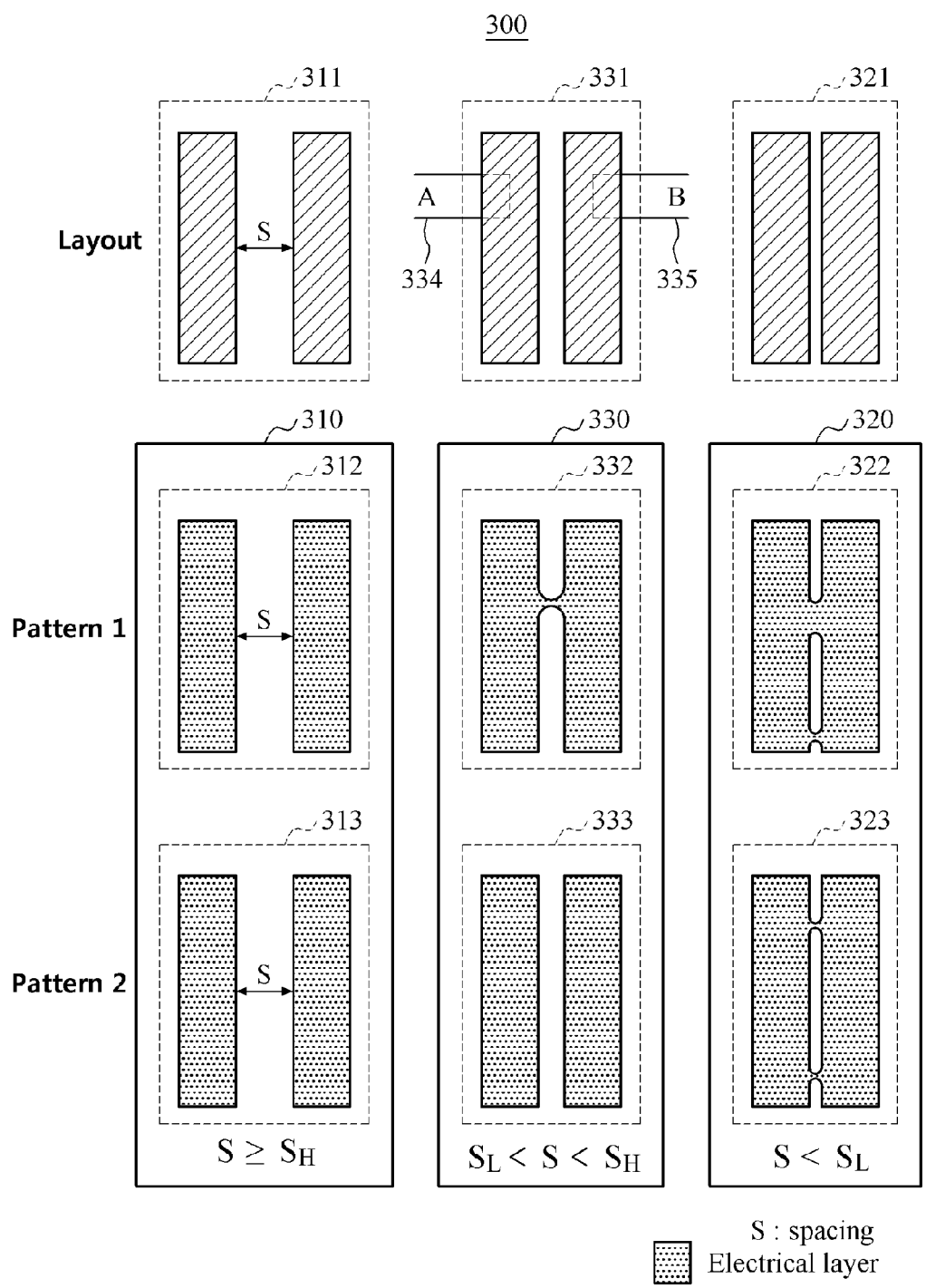
FIG. 3 is a diagram provided to describe a concept of patterning of layers based on a value of a spacing in an example in which nodes are shorted and an example in which nodes are not shorted according to an embodiment.

FIG. 3 is a diagram provided to describe a concept of patterning of layers based on a value of a spacing in an example in which nodes are shorted and an example in which nodes are not shorted according to an embodiment.

In a design rule, a minimum spacing may guarantee that a first node 334 associated with a first conductive layer and a second node 335 associated with a second conductive layer are not electrically connected. In an example, when a spacing between conductive layers is reduced to be less than a specific spacing, a layer that is not shown in a layout or a mask may be added or remain between a first node and a second node. In this example, when the layer is added or remains, a probability that the first node and the second node are open may gradually decrease. In another example, when the spacing is equal to or less than another specific spacing, patterning between the first node and the second node may not be an open state.

In an example, a group 310 may correspond to a layout 311 in which a value of a spacing between a first conductive layer and a second conductive layer is equal to or greater than $S_H$. In the group 310, all nodes may be open. $S_H$ may be a minimum value of a spacing between conductive layers to guarantee that nodes are open. When the value of the spacing is equal to or greater than $S_H$, the nodes may be electrically open in a semiconductor manufacturing process.

For example, when conductive layers are disposed at a spacing that has a value equal to or greater than $S_H$, at least one of a pattern 1 312 and a pattern 2 313 may be formed. In both the pattern 1 312 and the pattern 2 313, a first node and a second node may be open.

In another example, a group 320 may correspond to a layout 321 in which a value of a spacing between a first conductive layer and a second conductive layer is equal to or less than $S_L$. In the group 320, all nodes may be shorted. $S_L$ may be a maximum value of a spacing between conductive layers to guarantee that nodes are shorted. When the value of the spacing is equal to or less than $S_L$, the nodes may be shorted in a semiconductor manufacturing process.

At least one of a pattern 1 322 and a pattern 2 323 may be formed. In both the pattern 1 322 and the pattern 2 323, a first node and a second node are shorted.

In still another example, a group 330 may correspond to a layout 331 in which a value of a spacing between a first conductive layer and a second conductive layer is equal to or greater than $S_L$ and equal to or less than $S_H$. In the group 330, nodes may be shorted or open. When the value of the spacing approaches $S_L$, a probability that the nodes are open may decrease, whereas a probability that the nodes are shorted may increase. When the value of the spacing approaches $S_H$, the probability that the nodes are open may increase. When one of the probabilities increases, randomness of a generated identification key may decrease.

The value of the spacing may be adjusted to be within a predetermined error range to sufficiently guarantee randomness of a generated identification key. By adjusting the value of the spacing, a probability that a short circuit occurs between nodes and a probability that the short circuit does not occur may have the same value, for example, 1/2. Thus, it is possible to sufficiently guarantee the randomness of the generated identification key.

A value of a spacing corresponding to an example in which a probability that a first node and a second node are open is 1/2 may be set to $S_M$.

$S_M$ may indicate that nodes may be open or shorted theoretically at a probability of 1/2. When the spacing is adjusted in a semiconductor manufacturing process, an error may also occur. A range allowable the error may be set.

A first threshold may be a lower limit value of a range of the spacing between the first conductive layer and the second conductive layer to allow a difference between a probability that the first node and the second node are shorted and a probability that the first node and the second node are not shorted to be within a predetermined error range.

The second threshold may be an upper limit value of the range.

Figure 4:
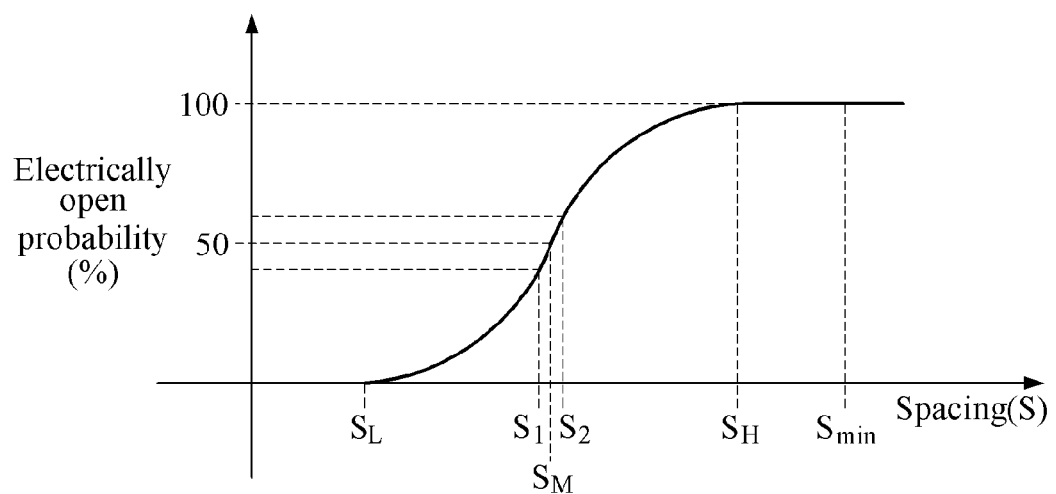
FIG. 4 is a graph illustrating a probability that nodes are open based on a value of a spacing according to an embodiment.

FIG. 4 is a graph illustrating a probability that nodes are open based on a value of a spacing according to an embodiment.

In the graph, a horizontal axis represents a value of a spacing, that is, a gap between a first conductive layer and a second conductive layer, and a vertical axis represents a probability that a first node and a second node are open.

$S_{min}$ denotes a minimum spacing value according to a design rule that ensures that the first node and the second node are open. $S_H$ denotes a minimum spacing value guaranteeing that the first node and the second node are electrically open. $S_L$ denotes a maximum spacing value guaranteeing a short circuit between the first node and the second node. $S_M$ denotes a value of a spacing theoretically corresponding to 50%, that is, a probability that the first node and the second node are open or a probability that the first node and the second node are shorted.

When $S_M$ is set as the value of the spacing, randomness may be theoretically guaranteed. Even though a semiconductor chip is manufactured based on $S_M$, a process variation may occur. As a result of an actual manufacturing process, a few errors may occur due to the process variation. In an actual process, it may be difficult to exactly determine $S_M$. Thus, the value of the spacing between the first conductive layer and the second conductive layer may be set to be closest to $S_M$ by repeating a process of manufacturing a semiconductor chip based on different values of the spacing and measuring an identification key.

When the value of the spacing is within a predetermined error range in which randomness is theoretically guaranteed, a condition of an apparatus for generating an identification key may be satisfied.

Thus, the value of the spacing may be set within a range of $S_1$ and $S_2$ in which whether the first node and the second node are shorted have a predetermined allowable error based on 50%, by adjusting the gap between the first conductive layer and the second conductive layer.

$S_1$ may be a lower limit value of a spacing range allowing a difference between a probability that the first node and the second node are shorted and a probability that the first node and the second node are not shorted to be within a predetermined error range, and may be equal to or greater than a maximum spacing value guaranteeing that the first node and the second node are shorted.

$S_2$ may be an upper limit value of the spacing range allowing the difference between the probability that the first node and the second node are shorted and the probability that the first node and the second node are not shorted to be within the predetermined error range, and may be equal to or less than a minimum spacing value guaranteeing that the first node and the second node are open.

Figure 5:
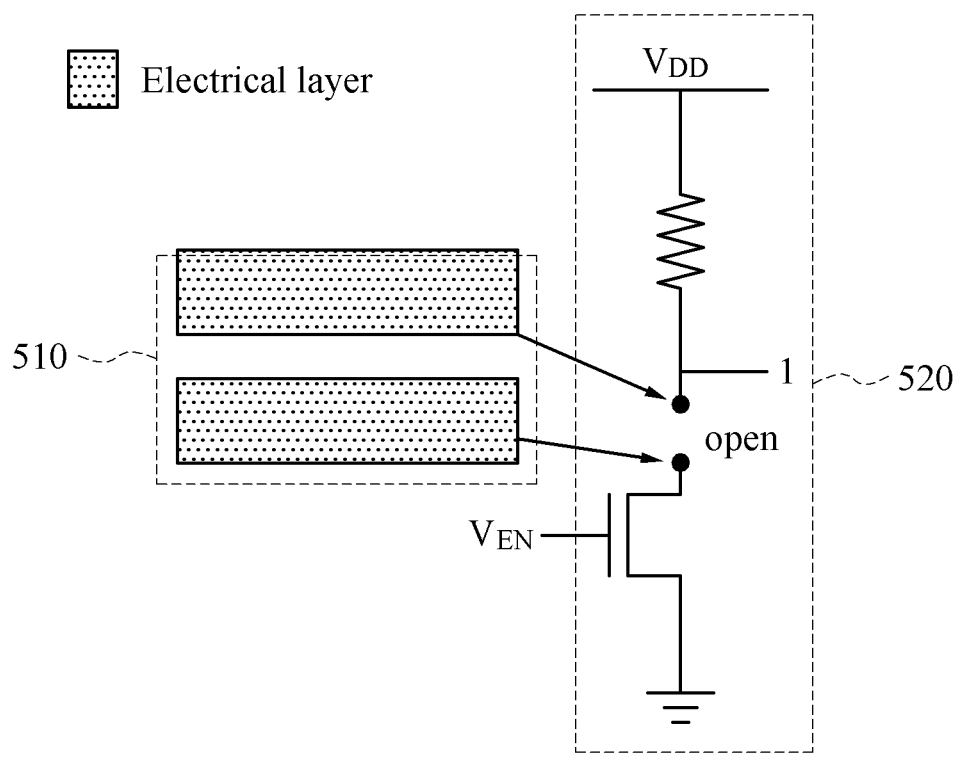
FIG. 5 is a diagram illustrating an example in which nodes are open in an identification key generation circuit according to an embodiment.

FIG. 5 is a diagram illustrating an example in which nodes are open in an identification key generation circuit according to an embodiment.

A circuit 500 for generation of an identification key may include an identification key generator 510 and a reader 520.

The identification key generator 510 may include a first conductive layer and a second conductive layer. The reader 520 may determine whether a first node and a second node are electrically shorted, and may provide an identification key.

For example, the reader 520 may have a structure of a pull-down circuit including a resistor and an N-channel metal oxide semiconductor (NMOS) transistor. Based on whether the first node and the second node in the identification key generator 510 are open or shorted, a connection between an output node and a drain node of the NMOS transistor may be open or shorted.

When an enable signal transmitted to a gate of the NMOS transistor has a high value, and when the first node and the second node are open, an output value may be "1."

Figure 6:
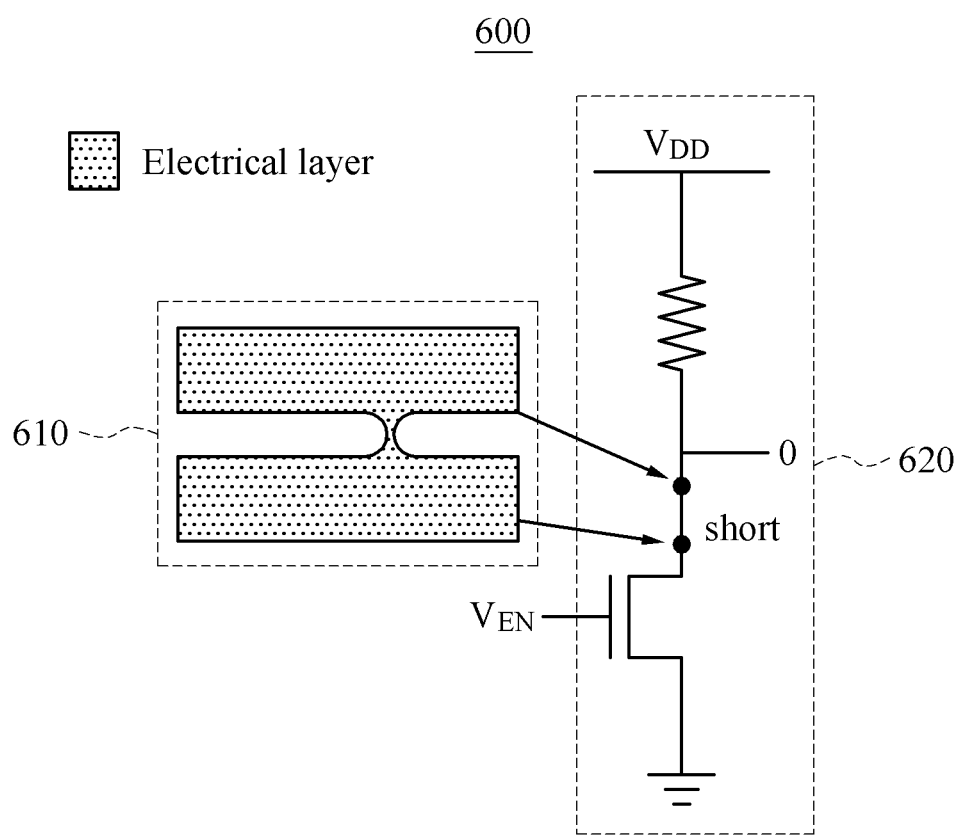
FIG. 6 is a diagram illustrating an example in which nodes are shorted in an identification key generation circuit according to an embodiment.

FIG. 6 is a diagram illustrating an example in which nodes are shorted in an identification key generation circuit according to an embodiment.

A circuit 600 for generation of an identification key may include an identification key generator 610 and a reader 620.

The identification key generator 610 may include a first conductive layer and a second conductive layer. The reader 620 may determine whether a first node and a second node are shorted, and may provide an identification key.

For example, the reader 620 may have a structure of a pull-down circuit including a resistor and an NMOS transistor. Based on whether the first node and the second node in the identification key generator 510 are open or shorted, a connection between an output node and a drain node of the NMOS transistor may be open or shorted.

When an enable signal transmitted to a gate of the NMOS transistor has a high value, and when the first node and the second node are shorted, an output value may be "0."

FIG. 7 is a flowchart illustrating a method of manufacturing an apparatus for generating an identification key according to an embodiment.

In operation 710, a first conductive layer and a second conductive layer may be formed in a semiconductor chip layout. A first node may be associated with the first conductive layer, and a second node may be associated with the second conductive layer.

A spacing, that is, a gap between the first conductive layer and the second conductive layer may have a value equal to or greater than a first threshold and equal to or less than a second threshold. The first threshold and the second threshold may be less than a minimum spacing value according to a design rule that ensures that the first node and the second node are open.

In operation 720, a reader may be formed in the semiconductor chip layout.

FIG. 8 is a flowchart illustrating a method of designing an apparatus for generating an identification key according to an embodiment.

In operation 810, a first conductive layer and a second conductive layer may be disposed in a semiconductor chip layout.

The first conductive layer and the second conductive layer may be disposed at a spacing that has a value equal to or greater than a first threshold and equal to or less than a second threshold. The first threshold and the second threshold may be less than a minimum spacing value according to a design rule that ensures that a first node and a second node are electrically open.

The first threshold may be a lower limit value of a range of a spacing between the first conductive layer and the second conductive layer to allow a difference between a probability that the first node and the second node are shorted and a probability that the first node and the second node are not shorted to be within a predetermined error range. The second threshold may be an upper limit value of the range. The first conductive layer and the second conductive layer may be disposed to be within the predetermined error range.

At least one of the first conductive layer and the second conductive layer may correspond to at least one of an N-well region, a P-well region, an N+ active region, a P+ active region, a poly layer and a metal layer included in a semiconductor chip.

In operation 820, a reader may be disposed in the semiconductor chip layout. The reader may determine whether the first node and the second node are electrically shorted.

Figure 9:
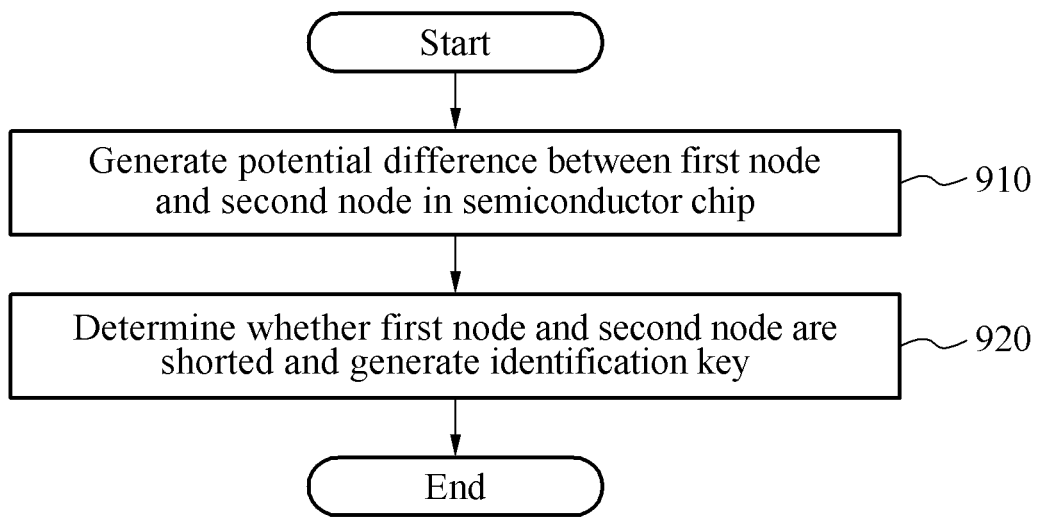
FIG. 9 is a flowchart illustrating a method of generating an identification key according to an embodiment.

FIG. 9 is a flowchart illustrating a method of generating an identification key according to an embodiment.

In operation 910, a potential difference between a first node and a second node in a semiconductor chip may be generated. The first node may be associated with a first conductive layer, and the second node may be associated with a second conductive layer.

A spacing between the first conductive layer and the second conductive layer may have a value equal to or greater than a first threshold and equal to or less than a second threshold.

The first threshold may be a lower limit value of a range of the spacing between the first conductive layer and the second conductive layer to allow a difference between a probability that the first node and the second node are shorted and a probability that the first node and the second node are not shorted to be within a predetermined error range.

The second threshold may be an upper limit value of the range.

In operation 920, whether the first node and the second node are shorted may be determined and an identification key may be provided.

The units described herein may be implemented using hardware components, software components, and/or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. An apparatus for generating an identification key, the apparatus comprising:
   a first conductive layer formed in a semiconductor chip;
   a second conductive layer formed in the semiconductor chip, a spacing between the first conductive layer and the second conductive layer being equal to or greater than a first threshold and equal to or less than a second threshold, wherein a first node associated with the first conductive layer and a second node associated with the second conductive layer are randomly shorted or opened based upon a process variation occurring in the semiconductor chip, the process variation causing material to remain between the first node and the second node, wherein the remained material is the same material as that of the first conductive layer and the second conductive layer; and
   a reader configured to determine whether the first node and the second node are shorted due to the process variation occurring in the semiconductor chip and to provide the identification key.

2. The apparatus of claim 1, wherein the first threshold is a lower limit value of a range of the spacing between the first conductive layer and the second conductive layer to allow a difference between a probability that the first node and the second node are shorted and a probability that the first node and the second node are not shorted to be within a predetermined error range, and
   wherein the second threshold is an upper limit value of the range.

3. The apparatus of claim 1, wherein at least one of the first conductive layer and the second conductive layer is at least a portion of wires individually patterned.

4. The apparatus of claim 1, wherein at least one of the first conductive layer and the second conductive layer corresponds to at least one of an N-well region, a P-well region, an N+ active region, a P+ active region, a poly layer and a metal layer included in the semiconductor chip.

5. The apparatus of claim 1, wherein the first threshold is equal to or greater than a maximum spacing between the first conductive layer and the second conductive layer to guarantee that the first node and the second node are shorted by the first conductive layer and the second conductive layer, and
   wherein the second threshold is equal to or less than a minimum spacing between the first conductive layer and the second conductive layer to guarantee that the first node and the second node are open by the first conductive layer and the second conductive layer.

6. An apparatus for generating an N-bit identification key, the apparatus comprising N unit cells that each generate a 1-bit digital value,
   wherein at least one of the N unit cells comprises:
     a first conductive layer formed in a semiconductor chip;
     a second conductive layer formed in the semiconductor chip, a spacing between the first conductive layer and the second conductive layer being equal to or greater than a first threshold and equal to or less than a second threshold, wherein a first node associated with the first conductive layer and a second node associated with the second conductive layer are randomly shorted or opened based upon a process variation occurring in the semiconductor chip, the process variation causing material to remain between the first node and the second node, wherein the remained material is the same material as that of the first conductive layer and the second conductive layer; and
     a reader configured to determine whether the first node and the second node are shorted due to the process variation occurring in the semiconductor chip and to provide an identification key.

7. The apparatus of claim 6, wherein the first threshold is a lower limit value of a range of the spacing between the first conductive layer and the second conductive layer to allow a difference between a probability that the first node and the second node are shorted and a probability that the first node and the second node are not shorted to be within a predetermined error range, and
   wherein the second threshold is an upper limit value of the range.

8. The apparatus of claim 6, wherein the first threshold is equal to or greater than a maximum spacing between the first conductive layer and the second conductive layer to guarantee that the first node and the second node are shorted by the first conductive layer and the second conductive layer, and
   wherein the second threshold is equal to or less than a minimum spacing between the first conductive layer and the second conductive layer to guarantee that the first node and the second node are open by the first conductive layer and the second conductive layer.

* * * * *